Patented June 7, 1938

2,119,527

UNITED STATES PATENT OFFICE 2,119,527

SALTS OF CINCHONA ALKALOIDS AND PROCESSES FOR THEIR PRODUCTION

Otto Dalmer and Fritz von Werder, Darmstadt, Germany, assignors to Merck & Co., Inc., Rahway, N. J., a corporation of New Jersey No Drawing. Application January 18, 1935, Serial No. 2,356. In Germany January 22, 1934

5 Claims. (Cl. 260—26)

This invention relates to certain new coumarin-3-carboxylic acid salts of cinchona alkaloids and to processes for their production. More especially, it is directed to the quinine salt of this acid.

We have now found that the therapeutic effects of the compound of this base with coumarin-3-carboxylic acid greatly exceed the therapeutic effectiveness of quinine and its salts used in medicine. Thus, for instance, an increase in the sedative action is especially pronounced, as shown by the fact that a more pronounced and more rapid sedative action is obtained through the use of relatively small doses of the quinine salt of coumarin-3-carboxylic acid, than is obtained from considerably larger doses of quinine alone.

For example, in tests on mice, it was found that even so small a dosage as 0.1 mg./g. of the new compound exerts a noticeable sedative effect, whereas, with quinine hydrochloride, a dose of 0.75/g. is necessary in order to obtain the same degree of effect.

Furthermore, the pronounced bitter taste which is so characteristic of quinine and its usual salts is considerably mitigated.

This new compound is prepared by reacting upon quinine with coumarin-3-carboxylic acid as set forth in the examples. Obviously, these steps may be modified considerably without departing from the spirit of the invention substantially as described and claimed, and it is understood that we do not desire to limit ourselves to the specific embodiments shown.

Examples

I. 76 parts by weight of coumarin-3-carboxylic acid are dissolved in 1600 parts by volume of acetone, and 129.6 parts by weight of anhydrous quinine are dissolved in 2400 parts by volume of acetone. The combined solutions are boiled with refluxing for ½ hour and thereafter concentrated to the starting point of crystallization. After cooling and filtering by suction, the crystalline substance is washed with acetone and recrystallized from boiling water. In this way, 146 parts by weight of pure salt are obtained in lustrous colorless needles. The melting point of the air-dry material is 137° C.–139° C.

II. 95 parts by weight of coumarin-3-carboxylic acid and 162 parts by weight of anhydrous quinine are ground to a fine state of subdivision. The mixture is then carefully melted in an oil bath at 15° C. The cooled concentrate is dissolved in alcohol and the salt is precipitated by adding a four-fold volume of ether. By recrystallizing the isolated material from boiling water, using a small quantity of animal charcoal, 96 parts by weight of pure salt are obtained.

III. 119 parts of quinine hydrochloride are dissolved in 15,000 parts of water. To this solution are added 89 parts of silver coumarin-3-carboxylic acid. The mixture is heated under constant stirring, boiled for a short time, and filtered while hot. The solution is then cooled and 135 parts of pure quinine-coumarin-3-carboxylic acid are obtained in the form of colorless needles.

We claim as our invention:

1. Coumarin-3-carboxylic acid salt of quinine occurring in the form of lustrous colorless needles, and which, in its pure, air-dry form melts at about 137–139° C.

2. A process for the production of the coumarin-3-carboxylic acid salt of quinine which comprises reacting upon quinine with coumarin-3-carboxylic acid.

3. A process for the production of the coumarin-3-carboxylic acid salt of quinine which comprises dissolving the acid and the base in appropriate solvents, combining the solutions, and thereafter crystallizing out said salt.

4. A process for the production of the coumarin-3-carboxylic acid salt of quinine, which comprises melting said acid and base together, cooling the resultant molten mass and dissolving in alcohol, precipitating the salt by the addition of ether, and thereafter recrystallizing said salt from boiling water.

5. The coumarin-3-carboxylic acid salt of quinine.

OTTO DALMER.
FRITZ VON WERDER.